(12) United States Patent
Ramesh et al.

(10) Patent No.: US 7,996,350 B2
(45) Date of Patent: Aug. 9, 2011

(54) VIRTUAL INTELLIGENT FABRIC

(75) Inventors: Tirumale K. Ramesh, Centreville, VA (US); John L. Meier, St. Charles, MO (US)

(73) Assignee: The Boeing Company, Chicago, IL (US)

(*) Notice: Subject to any disclaimer, the term of this patent is extended or adjusted under 35 U.S.C. 154(b) by 826 days.

(21) Appl. No.: 12/042,967

(22) Filed: Mar. 5, 2008

(65) Prior Publication Data

US 2009/0228418 A1    Sep. 10, 2009

(51) Int. Cl.
*G06N 3/08* (2006.01)
*G05B 13/00* (2006.01)
*G06F 15/16* (2006.01)
*G06F 15/18* (2006.01)

(52) U.S. Cl. .............. 706/46; 706/10; 706/14; 706/22
(58) Field of Classification Search .................. 706/46
See application file for complete search history.

(56) References Cited

U.S. PATENT DOCUMENTS

| | | | |
|---|---|---|---|
| 6,744,729 | B2 | 6/2004 | Tinsley |
| 7,299,339 | B2 | 11/2007 | Ramesh |
| 2005/0182582 | A1 | 8/2005 | Chen |
| 2006/0031450 | A1 | 2/2006 | Unrue et al. |
| 2006/0095716 | A1 | 5/2006 | Ramesh |
| 2008/0040574 | A1 | 2/2008 | Ramesh |

OTHER PUBLICATIONS

Russel et al., Interoperable Grid Agent Middleware for Scientific Instruments and Sensors, [online] 2006 [retrieved on Mar. 18, 2011]. Retrieved from the Internet:<http://delivery.acm.org/10.1145/1190000/1186698/a21-russel.pdf?key1=1186698&key2=64087400 31&coll=DL&dl=A CM&ip=151.207.246.4&CFID=14149083&CFTOKEN=68911467>.*
Russel et al., Towards Dynamic Data Grid Framework for eResearch, [online] 2006 [retrieved on Mar. 18, 2011], Retrieved from the Internet:<http://crpit.com/confpapers/CRPITV54Russel.pdf>.*

(Continued)

*Primary Examiner* — Jeffrey A Gaffin
*Assistant Examiner* — Nathan H Brown, Jr.
(74) *Attorney, Agent, or Firm* — Klintworth & Rozenblat IP LLC

(57) ABSTRACT

An intelligent distributed computing fabric system may comprise a cognitive element, a computing element, a security element, and a network element. The cognitive element may receive inputs from the computing element, the security element, and the network element, and may further receive external information from a sensor interface. The cognitive element may process the inputs from the computing element, the security element, and the network element, and may additionally process the external information from the sensor interface. The cognitive element may make decisions based on the inputs from the computing element, the security element, and the network element, and based on the external information from the sensor interface, to adapt for dynamically varying situations in a fabric infrastructure. The cognitive element may outputs instructions for actions, based on the dynamic decisions, to the computing element, the security element, and the network element in order to virtually interconnect the computing element, the security element, and the network element. The computing element may transmit inputs to the cognitive element. The computing element may receive the dynamic output instructions from the cognitive element. The computing element may follow the dynamic output instructions as commands from the cognitive element. The security element may receive inputs from the computing element and the network element. The security element may transmit current security policy inputs to the cognitive element. The network element may transmit inputs to the security element and to the cognitive element.

25 Claims, 21 Drawing Sheets

OTHER PUBLICATIONS

Burger et al., "Scaling to the End of Silicon with EDGE Architectures", [online] 2004 [retrieved on Mar. 19, 2011]. Retrieved from the nternet:<http://ieeexplore.ieee.org/stamp/stamp.jsp?tp=&arnumber=1310240>.*

Meier et al., "Intelligent Sensor Fabric Computing on a Chip—A Technology Path for Intelligent Network Computing", [online] 2007 [retrieved on Mar. 19, 2011]. Retrieved from the nternet:<http://ieeexplore.ieee.org/stamp/stamp.jsp?tp=&arnumber=4161622>.*

* cited by examiner

The mapping for fabric (Generality of Fabric Creation)

P←{M, R} where P is fabric dynamically driven by functinal and Quality of Service requierements.

The parameter of quality of Service requirements includes performance (sequential of parallel), data formats synchronization (loosely or thighly coupled), cost (data rate, latency), )quality of image, audio, response time, etc). P is optimized to cover as many edge modes as possible to fabric.

M is the fabric attributes defined in terms of Capabilities (C), Fabric Computing Action (A) and Reasoning (B) and R is the reconfigurable connectivity for virtual fabric formation.

P←{(A1,A2,A3,A4,A5,A6), (B1,B2,B3), (C1,C2,C3,C4), FG ((E (1) ... E(n)), (FC(1), FC(2) ... FC(k), ...)}

Where M is mapped to {54,55,56,57), (58,59,60,61), (62,63,64,65,66,83,84) } and R is mapped to graph {FG ((E (1) ... E(n)), F(1),F(2), ... F(k), ...)}

FIG. 13

| Fabric Cell | Nodes/ Cell | Node 1 | Node 2 | Node 3 | Node n |
|---|---|---|---|---|---|
| F1 88 | <1,2,3> | <3> | <3> | <1,2> | |
| F2 89 | <1,2> | <2> | <1> | | |
| C1 92 | <F1,F2> | | | | |

FIG. 15A

VIRTUAL INTELLIGENT FABRIC

BACKGROUND

Sensors and networks may play a key role in providing data and events from the real world for processing. As applications move into network, liquidity of the system architecture may be necessary to provide a flexibly coupled user transparent system for connecting edge network computing devices. Many of the prior systems and methods may not have an abstract system that includes all key elements of computing, security and network intelligently driven by a cognitive architecture. For instance, in many of the prior systems, all application processing, network and security processing may be performed non-intelligently by computational resources with aggregation of massive parallel and distributed processing power, and adapted in run time with reconfiguration. In addition, in many of the prior systems, the morphing of these resources (in which an image of the processing infrastructure configured is mirrored at another place) does not necessarily support at the level of the morphing granularity selected by a cognitive control and may be without any inclusive dynamic control over the morphing via cognitive intelligence. One prior art, U.S. Pat. No. 6,744,729 suggest an intelligent fabric only as an intelligent switch to route data in the network fabric with traditional support of processing and network interfaces. Another prior art, U.S. Pat. No. 6,779,016, addresses a virtual farm for a server system (computing grid) but not in the context of a peer-to-peer embedded edge computing infrastructure. In addition, the prior art may not include the intelligence driven by a cognitive architecture and may not automatically include the distributed security support in the fabric. An intelligent distributed computing fabric system is needed to reduce and/or eliminate one or more problems of the prior art.

SUMMARY

In one aspect of the disclosure, an intelligent distributed computing fabric system may comprise a cognitive element, a computing element, a security element, and a network element. The cognitive element may be configured to receive inputs from the computing element, the security element, and the network element, and to receive external information from a sensor interface. The cognitive element may be configured to process the inputs from the computing element, the security element, and the network element, and to additionally process the external information from the sensor interface. The cognitive element may be configured to make decisions based on the inputs from the computing element, the security element, and the network element, and based on the external information from the sensor interface, to adapt for dynamically varying situations in a fabric infrastructure. The cognitive element may be configured to output instructions for actions, based on the dynamic decisions, to the computing element, the security element, and the network element in order to virtually interconnect the computing element, the security element, and the network element. The computing element may be configured to transmit inputs to the cognitive element. The computing element may be configured to receive the dynamic output instructions from the cognitive element. The computing element may be configured to follow the dynamic output instructions as commands from the cognitive element. The security element may be configured to receive inputs from the computing element and the network element. The security element may be configured to transmit current security policy inputs to the cognitive element. The network element may be configured to transmit inputs to the security element and to the cognitive element.

In another aspect of the disclosure, an intelligent distributed computing fabric system may comprise a cognitive element, a computing element, a security element, and a network element. The cognitive element may be configured to receive inputs from the computing element, the security element, and the network element. The cognitive element may be configured to process and manage requests from the computing element, the security element, and the network element. The cognitive element may be configured to transmit current fabric computing actions and current configurations to the computing element. The cognitive element may be configured to transmit the current fabric computing actions and the current configurations to the network element. The cognitive element may be configured to receive current resource states and status from the computing element. The cognitive element may be configured to control dynamic adjustment of security policy by the security element to adapt for varying dynamic situations. The cognitive element may be configured to output instructions for actions to the computing element, the security element, and the network element in order to virtually interconnect the computing element, the security element, and the network element. The computing element may be configured to receive and process current fabric states from the cognitive element. The computing element may be configured to receive requests from the cognitive element. The computing element may be configured to process requests received from the cognitive element. The computing element may be configured to receive and follow security instructions from the security element. The computing element may be configured to process instructions and data and to output to the network element. The security element may be configured to receive current fabric computing actions from the computing element. The security element may be configured to receive current network states from the network element. The security element may be configured to transmit security policy updates to the cognitive element. The network element may be configured to receive current fabric configurations from the cognitive element.

In still another aspect of the disclosure, a method of making dynamic decisions in an intelligent distributed computing fabric system may be provided. In one step, an intelligent distributed computing system may be provided. The intelligent distributed computing system may comprise a cognitive element, a computing element, a security element, and a network element. In another step, the cognitive element may receive inputs from the computing element, the security element, the network element, and from a sensor interface. In still another step, the cognitive element may process the inputs from the computing element, the security element, the network element, and from the sensor interface. In an additional step, the cognitive element may make dynamic decisions based on the inputs from the computing element, the security element, the network element, and from the sensor interface to adapt for varying dynamic situations. In yet another step, the cognitive element may output dynamic instructions as commands, based on the dynamic decisions, to the computing element and the network element.

BRIEF DESCRIPTION OF THE DRAWINGS

FIG. 13 shows a fabric creation mechanism;

FIG. 15A shows a table illustrating the fabric that may be created by collaboration of the nodes shown in FIG. 14;

DETAILED DESCRIPTION

Figure 1:
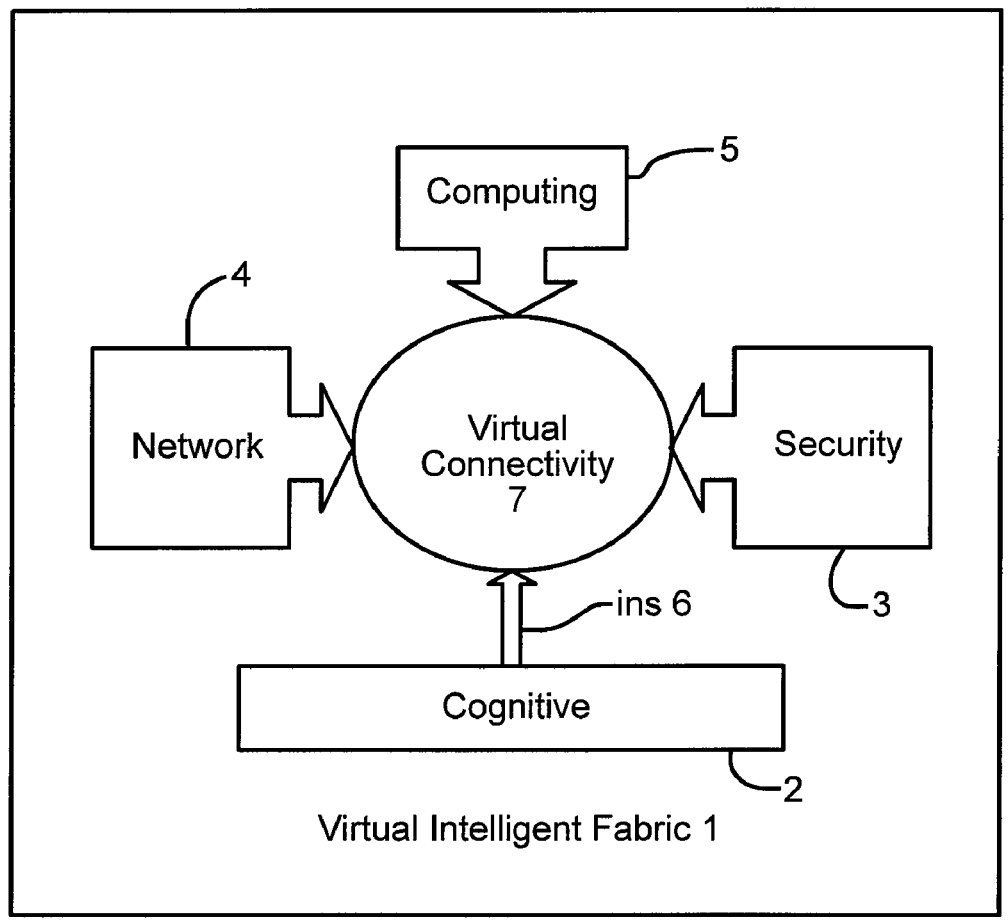
FIG. 1 shows a system diagram showing a four element view of a virtual intelligent fabric comprising a cognitive element, a security element, a networking element, and a computing element.

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Fabrics refer to an architecture comprised of processing, memories and interconnect fabric applied across a variety of granularity level of scale from global network to network on a chip. Fabrics may be particularly attractive for efficient implementation in chips to solve specific computational problems, especially in image, signal and network processing. The highly parameterized cellular and morphable architecture of the fabric may enable customized synthesis of fabric instances to achieve high performance in real-time for different classes of applications. These fabrics may be constructed with processors that are flexibly coupled to share many of the attributes of a loosely coupled network, including the ability to be disconnected and reconnected dynamically.

Fabric may allow for the creation of an environment of processing homogeneity in which aggregation of nodes using a unified address space appears the same as a single node, even though it may consists of a large number of nodes. Tight coupling may be achieved in hardware, software, or both, though performance will vary greatly with implementation. The generality of this tight coupling irrespective of software or hardware may be a substantial benefit. With a focus on edge embedded computing, edge nodes, fabric elements, and sensors may be mapped within a physical independent aware computing infrastructure. The cost associated with each edge may have implications to overall end-to-end communication latency and other performance metrics.

Virtual intelligent fabric may include high performance embedded computing infrastructure offering massive parallel and distributed processing power, storage that includes memory and cache, and bandwidth allocations to a network-centric service provider which may bundle end-to-end edge computing solution via virtualized entities. Virtual fabric elements may scale from global network to chips. Virtual intelligent Fabric computing may perform computations in a much more efficient manner in terms of processing throughput, power, storage and quality of service, etc. The fabric system may be focused on edge distributed computing to run and make decisions at the edge of the network. As a result, in the context of an edge to a node, it may not be physically tied to any specific resource. Therefore, the system may comprise virtual available resources.

As the computing, security and network infrastructures of today may be seen as inherent parts of a system, they may be driven by user transparent integration infrastructure demands. There may be a need for end users to seek resources with complete transparency to the underlying technologies. The instant disclosure may reduce one or more problems of the prior art systems and/or methods.

One benefit of virtual intelligent fabric may comprise direct optimal mapping of virtual resource allocation to edge computing nodes with intelligent management of network for Quality of Service (QoS) and situational awareness application with cognitive reasoning. Another benefit of virtual intelligent fabric may comprise a system-centric view of the platform which may be independent of the implementations and technologies. Still another benefit of virtual intelligent fabric is that it may provide a framework of component based software and hardware architecture approach which may be applied for hybrid computing with components residing in fabric elements (completely transparent to end users). There may also be substantial benefits in using automatic hardware acceleration insertion for application dynamic demand and optimization of network bandwidth usage and other QoS requirements. As complex systems-of-system concepts are in development today, virtual intelligent fabric may provide a natural connectivity of systems to extend to interoperable and heterogeneous platforms.

Figure 11:
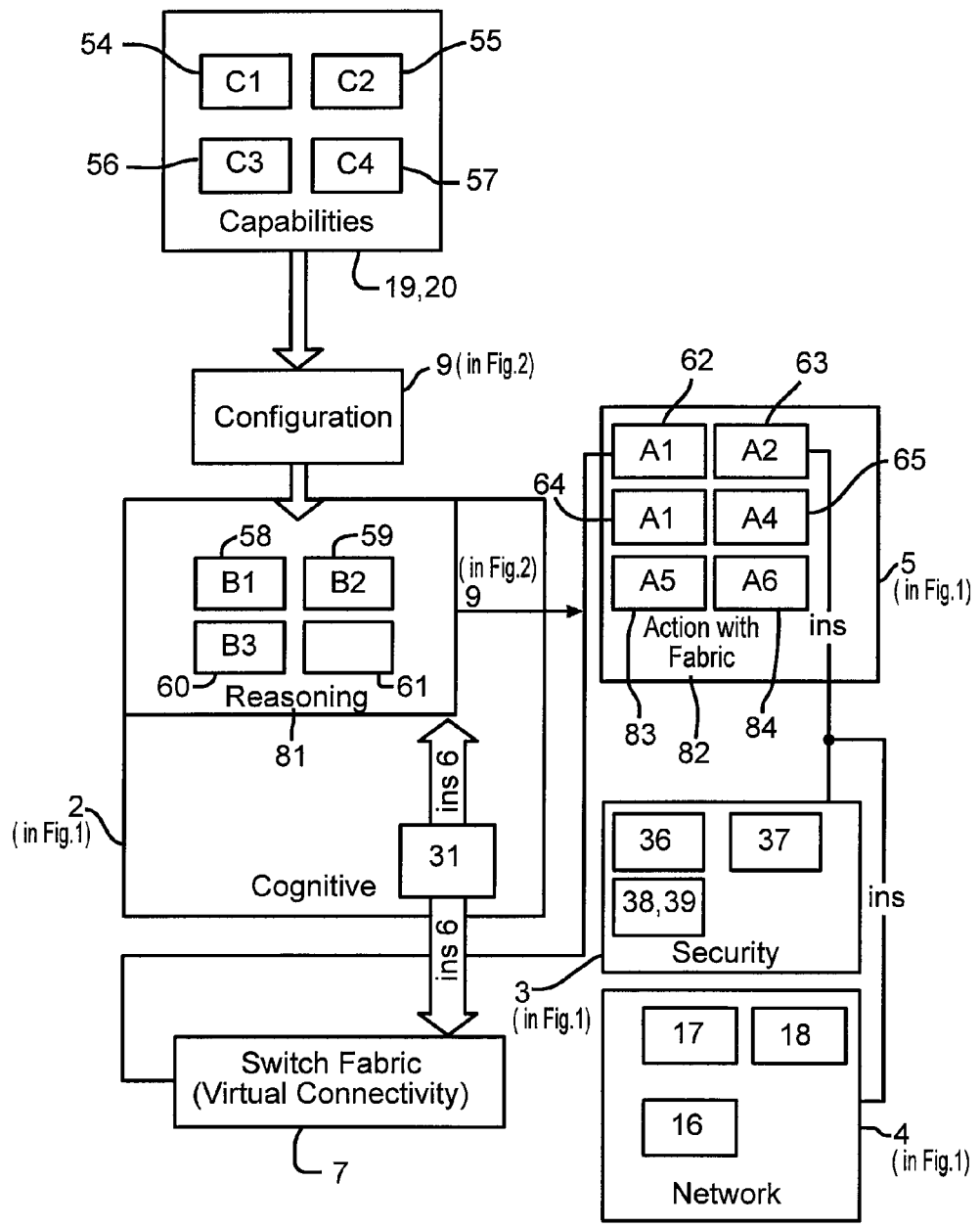
FIG. 11 shows a box diagram showing an entire fabric domain and the elemental relationships.

FIG. 1 is a system diagram showing a four element view of a virtual intelligent fabric 1 comprising a cognitive element 2, a security element 3, a networking element 4, and a computing element 5. The virtual intelligent fabric 1 may comprise a means of providing a very complex level of virtual system infrastructure by providing a universal connectivity across the four main elements including the cognitive element 2, the security element 3, the networking element 4, and the computing element 5. The virtual intelligent fabric 1 may combine powerful embedded computing capabilities, advanced networking features and distributed security formed into a single system infrastructure managed intelligently using a cognitive element by providing instructions 6 to elements 2, 3, 4, and 5. All of the elements 2, 3, 4, and 5 may be virtually connected by a virtual connectivity switch 7 as illustrated in FIG. 11.

The virtual intelligent fabric of the disclosure may be highly system centric as compared to a low level switch fabric (nodes connectivity among a small number of processor, network and input/output modules) with a high level of assured security driving across these resources. However, the switch fabric may become visible at the lowest level or modular level for physical implementation of virtual connections.

Figure 2:
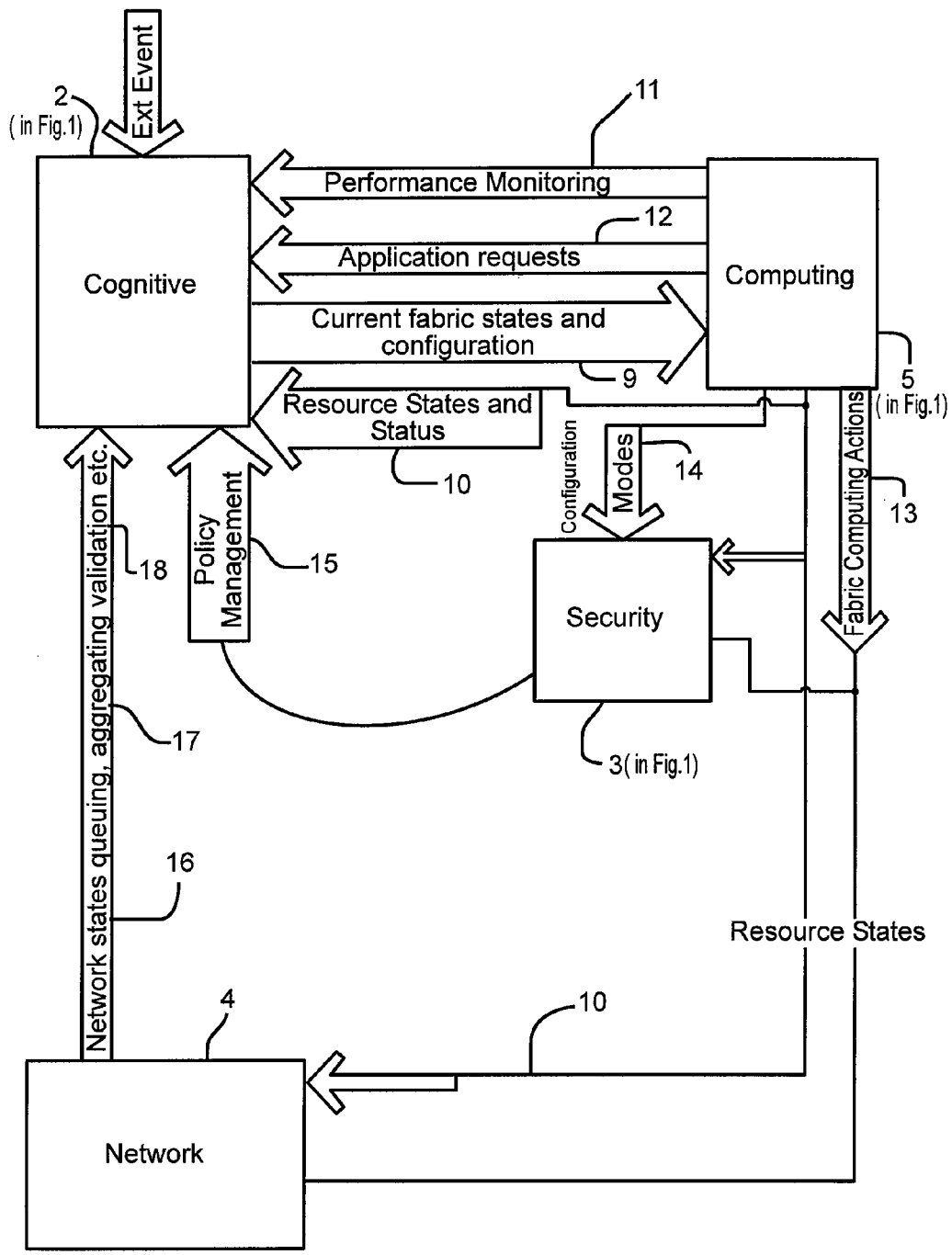
FIG. 2 shows an illustrative interaction flowchart showing the fabric elements.

FIG. 2 comprises an illustrative interaction flowchart showing the fabric elements of the disclosure. As shown, each element 2, 3, 4, and 5 in the fabric may interact with each other to exchange status, states, and/or configuration between them.

The cognitive element 2 of the virtual fabric may drive the computing element 5, the security element 3, and the network element 4. The cognitive element 2 may manage the resources intelligently and anticipate application needs. The cognitive element 2 may make dynamic decisions and may transfer new states and directions to the other elements 3, 4, and 5 in response to dynamic situations. The states may specify what fabric states that a fabric element is currently in to help in determining the optimum routing of information and in establishing groups of virtual entities within the fabric. The cognitive element 2 may interact with the computing element 5 through performance monitoring 11, application requests 12, current fabric states and configurations 9, and through resource states and status 10. The cognitive element 2 may interact with the security element 3 through policy management 15. The cognitive element 2 may interact with the network element 4 comprising of network states queuing 16, aggregation 17, and validation 18.

The computing element 5 of the virtual fabric may provide distributed and massive parallel computing aggregation, distributed processing, and/or prioritization of data transfer between nodes. The computing element 5 may interact with the network element 4 through fabric computing actions 13 and resource states 10. The computing element 5 may interact with the security element 3 through fabric computing actions 13, resource states 10, and computational modes 14. The computing element 5 may interact with the cognitive element 2 through performance monitoring 11, applications requests 12, current fabric states and configuration 9, and through resource states and status 10.

The network element 4 of the virtual fabric may provide adaptive network protocols and interfaces which may be intelligently deployed on the fly with bandwidth aggregation. This may be done by the network element interacting with the cognitive element 2 through network states 16, aggregation 17, and through validation 18. The network element 4 may interact with the security element 3 through policy management 15. The network element 4 may interact with the computing element 5 through performance monitoring 11, applications requests 12, fabric computing actions 13, current fabric states & configuration 9, and through resource states and status 10.

The security element 3 of the virtual fabric may provide distributed security reconfiguration support for dynamic policy enforcement and decisions supported by the security element 3 with dynamic policy generation from a policy model. The security element 3 may interact with the computing element 5 through computational modes 14, current fabric states & configuration 9, and resource states 10. The security element 3 may interact with the network element 4 through fabric computing actions 13, and through resource states 10. The security element 3 may interact with the cognitive element 2 through policy management 15.

Figure 3:
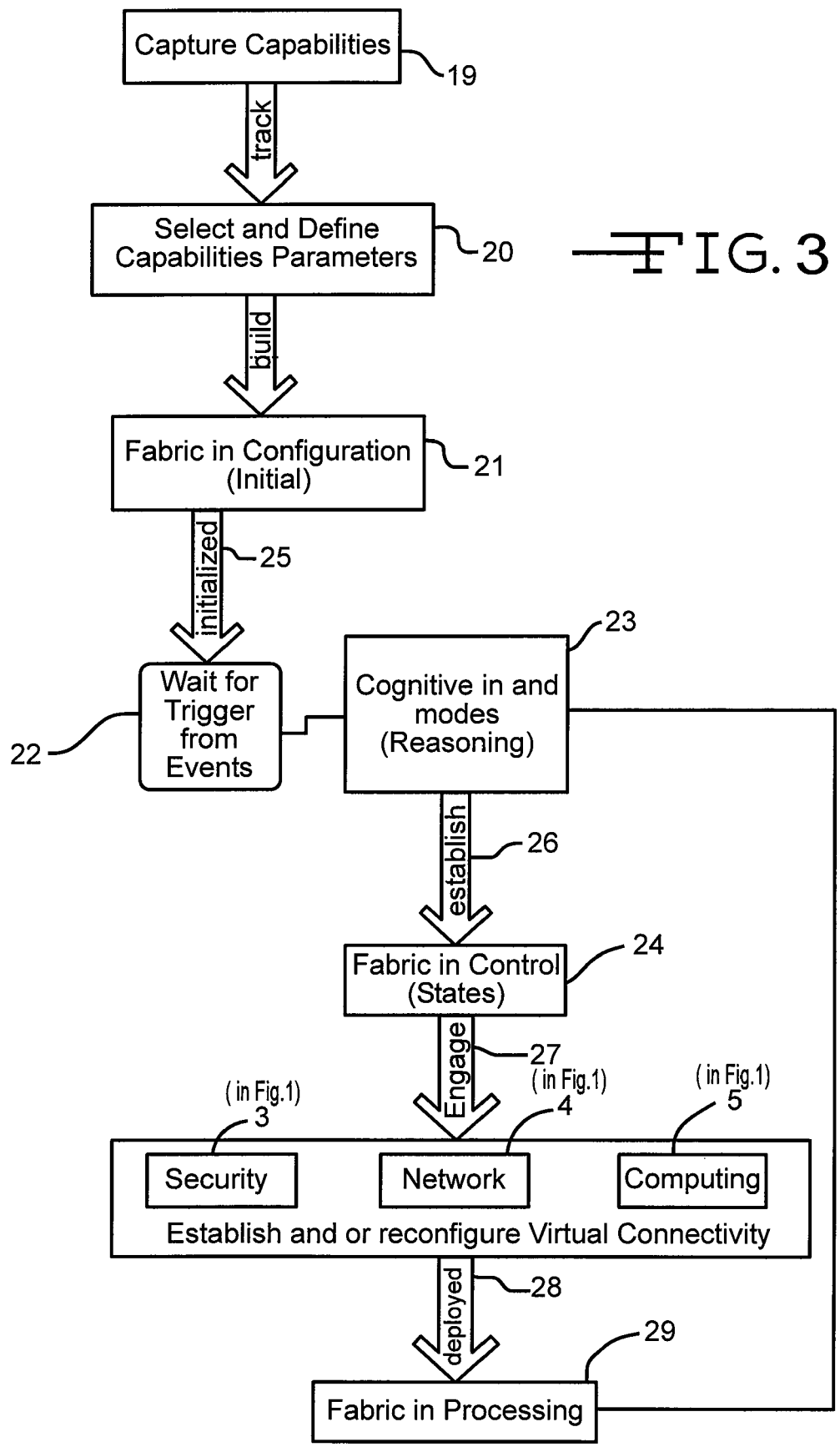
FIG. 3 shows a flowchart showing process steps to create and deploy fabric within a design space exploration.

FIG. 3 is a flowchart showing process steps to create and deploy fabric within a design space exploration. The steps may be fully autonomous within the infrastructure to make it completely transparent to the end user. Any reset conditions generated in the system may take the fabric to a default known starting position with capabilities identified and captured and the initial configuration set up. The fabric may be established and engaged fully using these process steps. In step 19, capture capabilities 19 may be identified. In step 20, the capabilities parameters may be selected and defined. In step 21, the fabric may be provided with an initial configuration. In step 25, initialization may be used as a trigger for events waiting step 22. In step 23, cognitive element reasoning may occur. In step 26, the cognitive reasoning may be established. In step 24, there may be fabric computing actions established. In step 27, there may be engagement of the fabric with collaborations of the security element 3, the network element 4, and the computing element 5 and to establish and/or reconfigure virtual connectivity. In step 28, there may be deployment of the fabric. In step 29, there may be real-time fabric processing for supporting application. The fabric in processing in real time of step 29 may interact with the cognitive element reasoning of step 23 to provide feedback.

Figure 4:
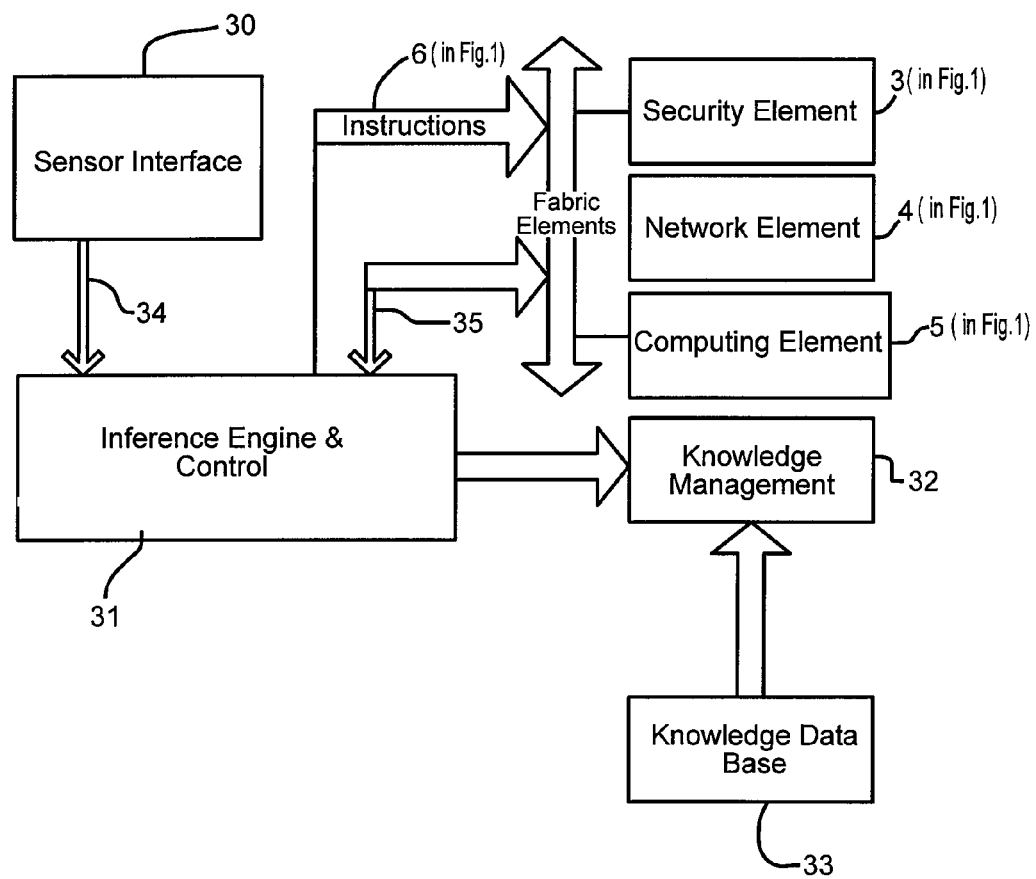
FIG. 4 shows an architecture view of the cognitive element.

FIG. 4 is a fabric architecture view of the cognitive element 2 shown in FIG. 1. The cognitive element 2 may drive the fabric network element 4 (network protocols adaptation and management), the computing element 5 (computing resources allocation and data and content management), and the security elements 3 (in managing policies for the fabric on the fly for secured transactions). The cognitive architecture governing the cognitive element 2 may include the fabric's dynamic control characteristics, in determining the control and privileges of the fabric, and in determining how these fabric elements may be clustered either in the same physical vicinity (in edge) or over the network (virtual neighborhood) for edge distributed computing. The cognitive element 2 may be the control brain that sends instructions 6 and receives inputs from the other fabric elements 3, 4, and 5.

The cognitive element 2 may comprise cognitive agent-based distributed computational entities and may carry out tasks autonomously to achieve end user goals. The cognitive infrastructure may consist of reconfigurable elements and intelligent management that evolves the information infrastructure policy and continuous learning from previous actions per situational awareness. From general system requirements, the cognitive element 2 may know what and when some event or anamoly occurs and may anticipate its occurrence in the future. The knowledge management 32 may manage the knowledge base 33 as required for knowledge history build up and save for subsequent reasoning. The cognitive reasoning engine 31 may receive inputs 34 from either an external sensor interface 30 or from an application. The cognitive reasoning engine 31 may send instructions 6 to the security element 3, network element 4, and/or computing element 5, and/or may interact 35 with the fabric elements 3, 4, and 5 back and forth. The cognitive element 2 may drive directly to enable instructions (agent) and/or may send data from its processed stage.

As illustrated in FIG. 2, policy management 15 may comprise an input from security element 3 which may further comprise several security functional roles as policy generations and distributions, decision making for policies, and enforcement of the policies for a set of reasoned situations. Network queuing behavior for accessing knowledge for improved performance tuning and aggregation for bandwidth allocation and optimization may act as outputs from the network element 4 to the cognitive element 2.

To assist in dynamic load balancing and aggregation and reallocation of processing powers, the computing element 5 may provide dynamic performance monitoring 11 to the cognitive element 2 to make decisions. Any inputs from the computing, network and/or security elements 5, 4, and 3 to the cognitive element 2 may be inhibited globally until the situation warrants continuation as specified by the policy management 15 from the security element 3. Fabric computing actions 13 from the computing element 5 may determine the computational adaptation (type of processing needed), scaling factor needed (the number of processors), the required processor and memory bandwidth ratios, the selection of hardware accelerators, the load balancing of multiple processors, and other types of items.

Figure 5:
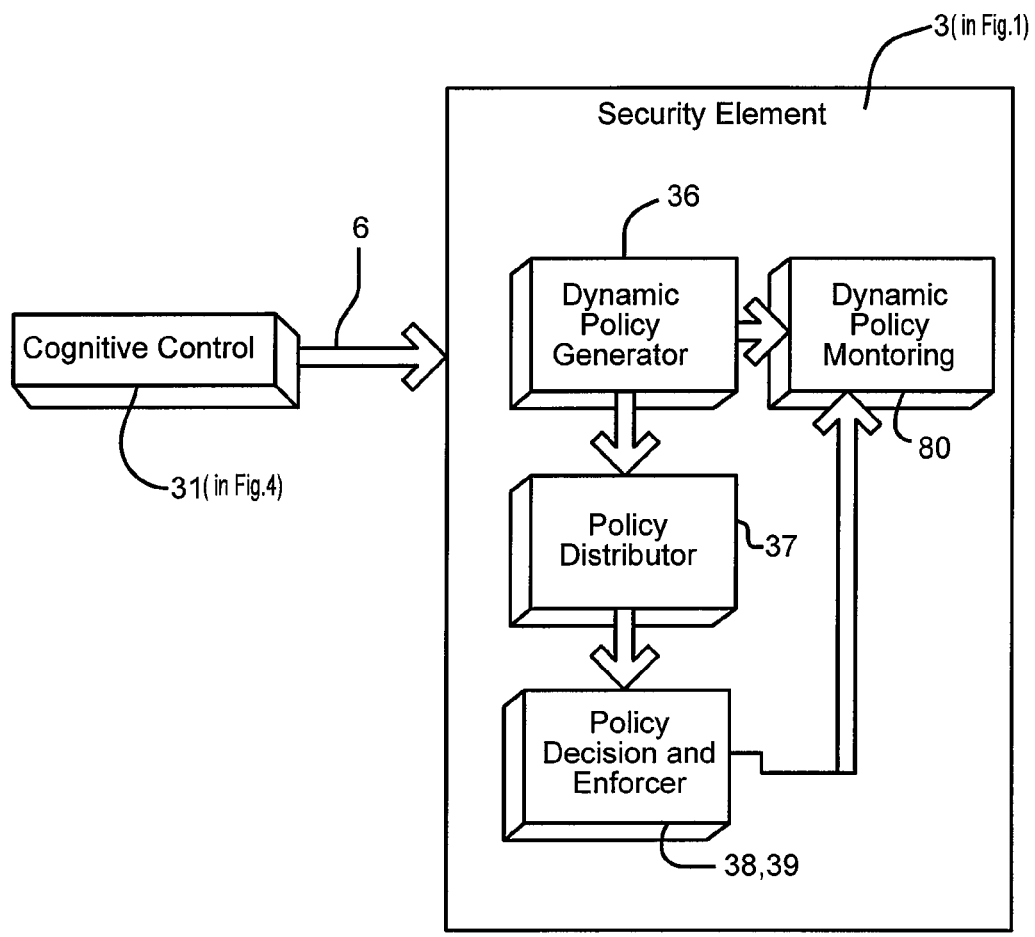
FIG. 5 shows a box diagram of a security element receiving instructions from a cognitive element.

FIG. 5 shows a box diagram showing a security element 3 receiving instructions 6 as commands from cognitive control 31. Security in embedded computing systems continues to be a challenging task. Secured systems may explode in number, their capabilities, and their uses. Some of the functions that a security element 3 may support include visualization, policy creation 36, distribution to end nodes 37, distributed policy decision 38, and enforcement 39. The security element 3 may provide a light-weight, secure interaction between embedded-system-end-nodes running applications, and may also provide policy monitoring 80 and execution of embedded system end nodes.

The network layers of the security element 3 may examine dynamically the security needs and vulnerabilities when connecting multiple edge devices in the network. The security element 3 may support security primitives (authentication, data integrity, privacy, access control, encryption, etc) with a collaborative security policy management, and adaptive node configurability. Fabric may be attached to these security primitives within the context of security domains.

Figure 6:
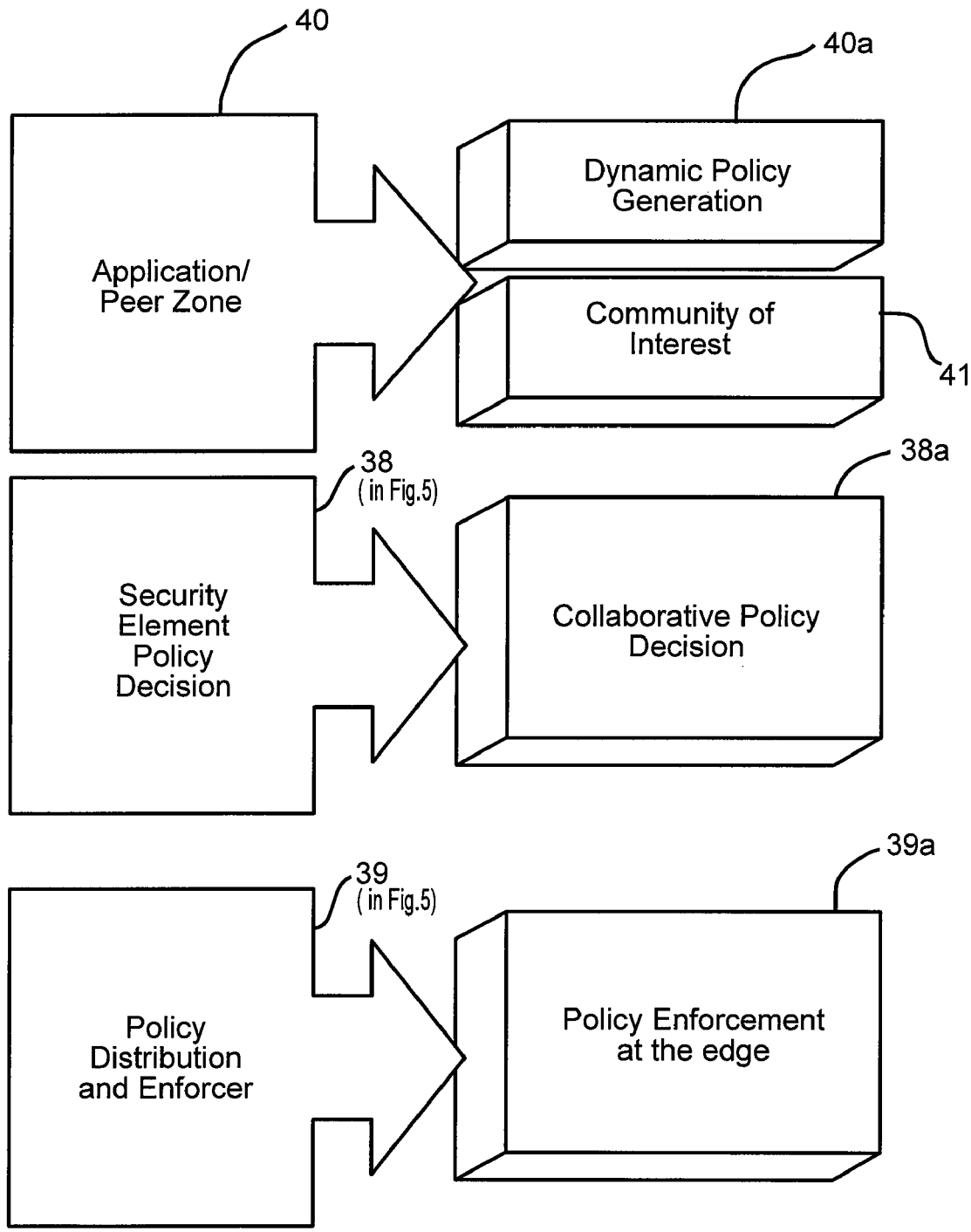
FIG. 6 shows a box diagram showing fabric mapped to the security element.

FIG. 6 shows a box-diagram showing fabric mapping of security element 3 of FIG. 1. The entire governance of the security function may be established by a distributed security architecture. The security element 3 may include application peer zone 40 providing dynamic policy generation 40a and community of interest 41 determining who gets access to what information. The security element 3 of FIG. 1 may store definitions of policies and lifecycle history of the policies included in the policy generation 40a shown in FIG. 6. The security element 3 of FIG. 1 may also include, as shown in FIG. 6, security element policy decision 38 providing collaborative policy decisions 38a. The security element 3 of FIG. 1 may also include, as shown in FIG. 6, policy distribution and enforcer 39 providing policy enforcement at edge 39a to decide and enforce the security policies. The security element 3 of FIG. 1 may also distribute the dynamic security policy to the dynamic network element 4. The security element 3 may distribute encryption in the fabric without a centralized key authority.

Figure 7:
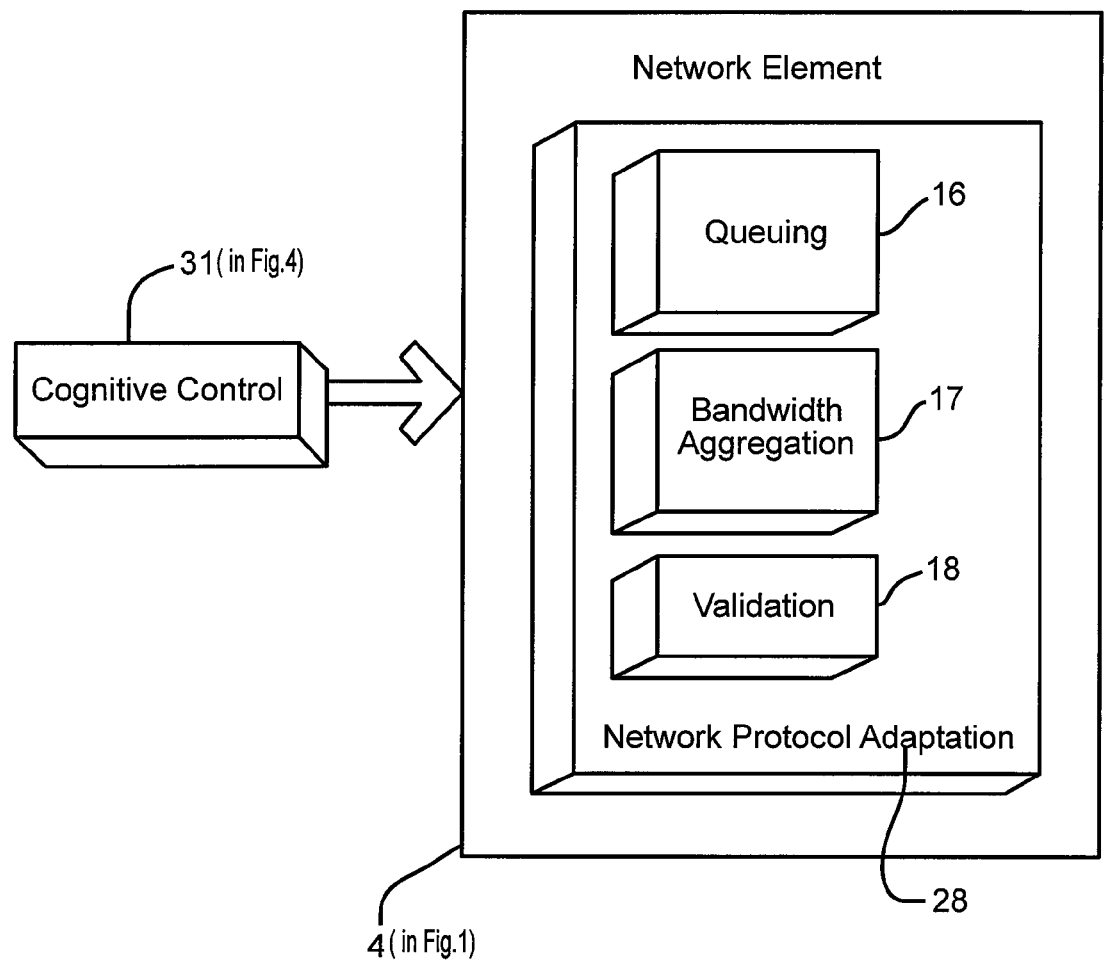
FIG. 7 shows a box diagram of the network element encompassing the network layer as it interacts with the cognitive element.

FIG. 7 shows a box diagram of the network element 4 encompassing the network layer as it interacts with the cognitive control 31. The network element 4 may provide support for dynamic protocol adaptation 28 for queuing 16, bandwidth aggregation 17, and validation 18 of important data to authorized parties for analysis and decision making. The network element 4 may comprise a variety of communication devices with vastly different characteristics. The network element 4 function of adapting to a changing network environment may require automatic adaptation of applications and protocols with an awareness of link conditions and network environment. On the fly adaptation of network protocols and reconfiguration for selected protocols and bandwidth aggregation 17 for traffic management may comprise main components of the network element 4.

Figure 8:
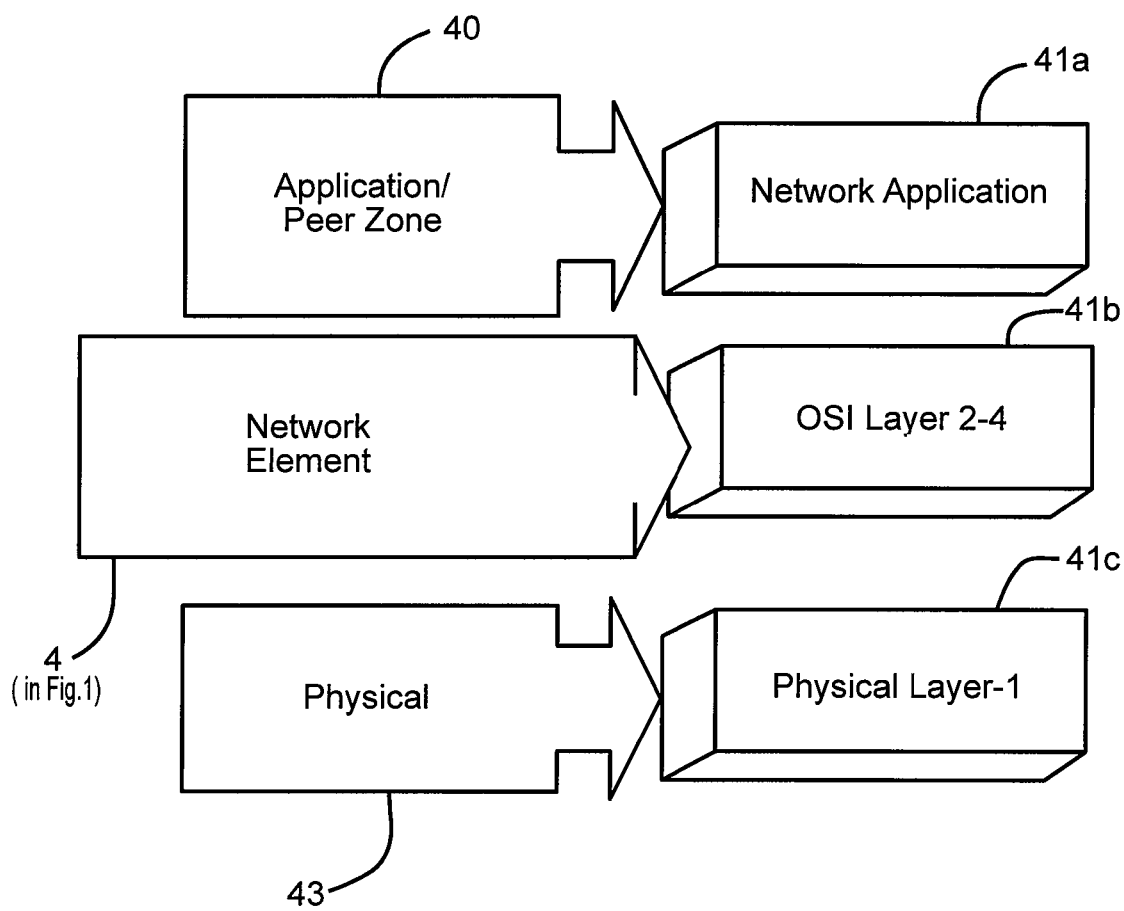
FIG. 8 shows a box diagram demonstrating fabric layers mapped to network layers of the network element.

FIG. 8 shows a box diagram demonstrating fabric layers mapped to network layers of the network element 4. As shown, an application/peer zone 40 may be mapped to the network application 41a. The network element 4 may be mapped to Open System Interconnection (OSI) layer 2-4 41b. Physical element 43 may be mapped to physical layer-1 41c. Fabric mapped to the networking layer may include routing and switching.

Figure 9:
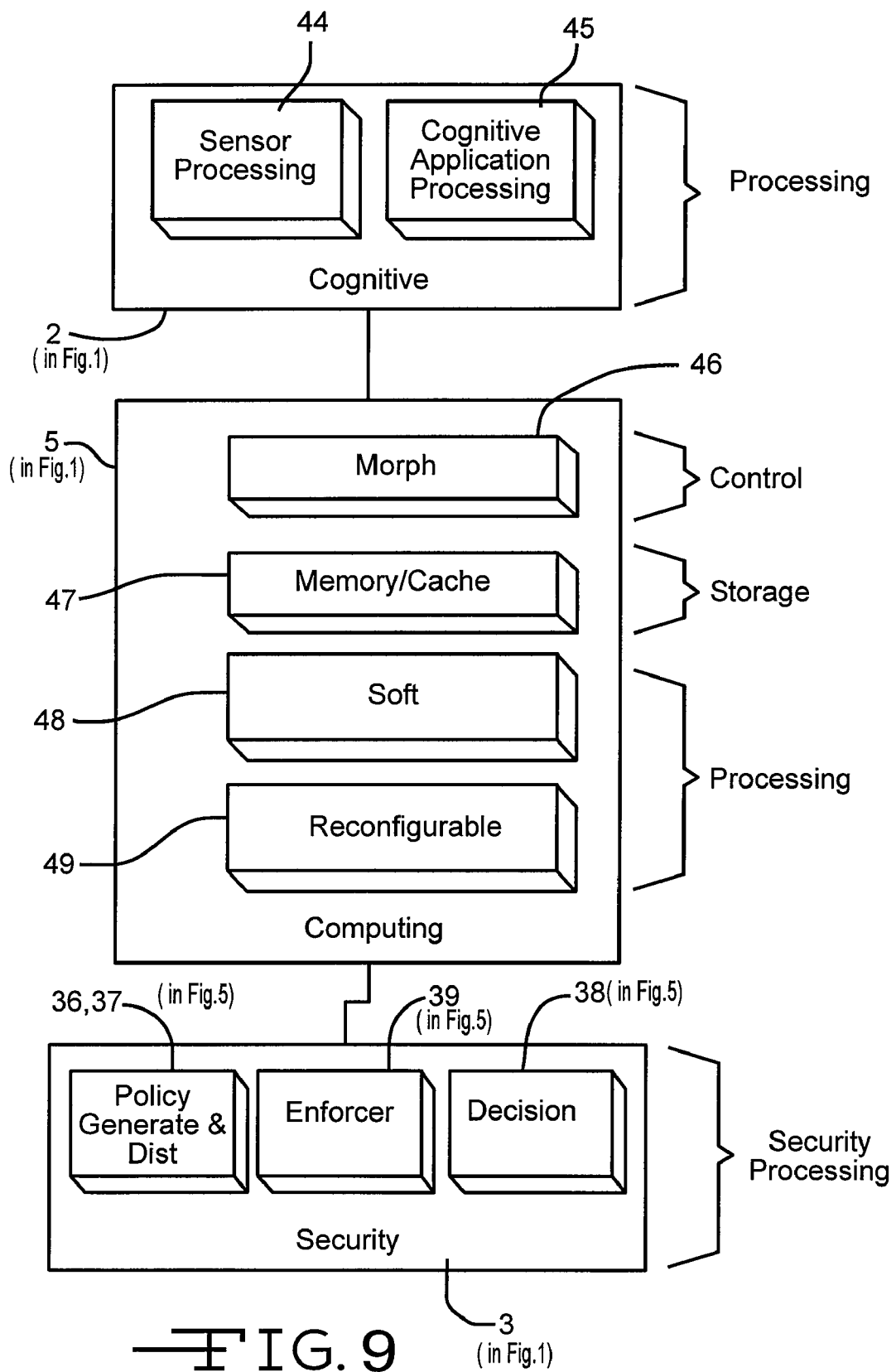
FIG. 9 shows a box diagram demonstrating internal processing and information storage capabilities of the computing element interacting with the cognitive element and the security element.

FIG. 9 shows a box diagram demonstrating internal processing and information storage capabilities of the computing element 5 interacting with the cognitive element 2 and the security element 3. The cognitive element 2 may comprise sensor processing 44 and cognitive application processing 45. The computing element 5 may comprise morph control 46, storage 47 (memory/cache), soft processing 48, and hardware reconfigurable processing 49. The morphing control 46 may provide morphing control of mirror image of the fabric instance group at a different level. The morphing control 46 is further discussed with respect to FIG. 17. The security element 3 may comprise security processing comprising policy generation and distribution 36 and 37, enforcer component 39, and decision component 38.

Figure 10:
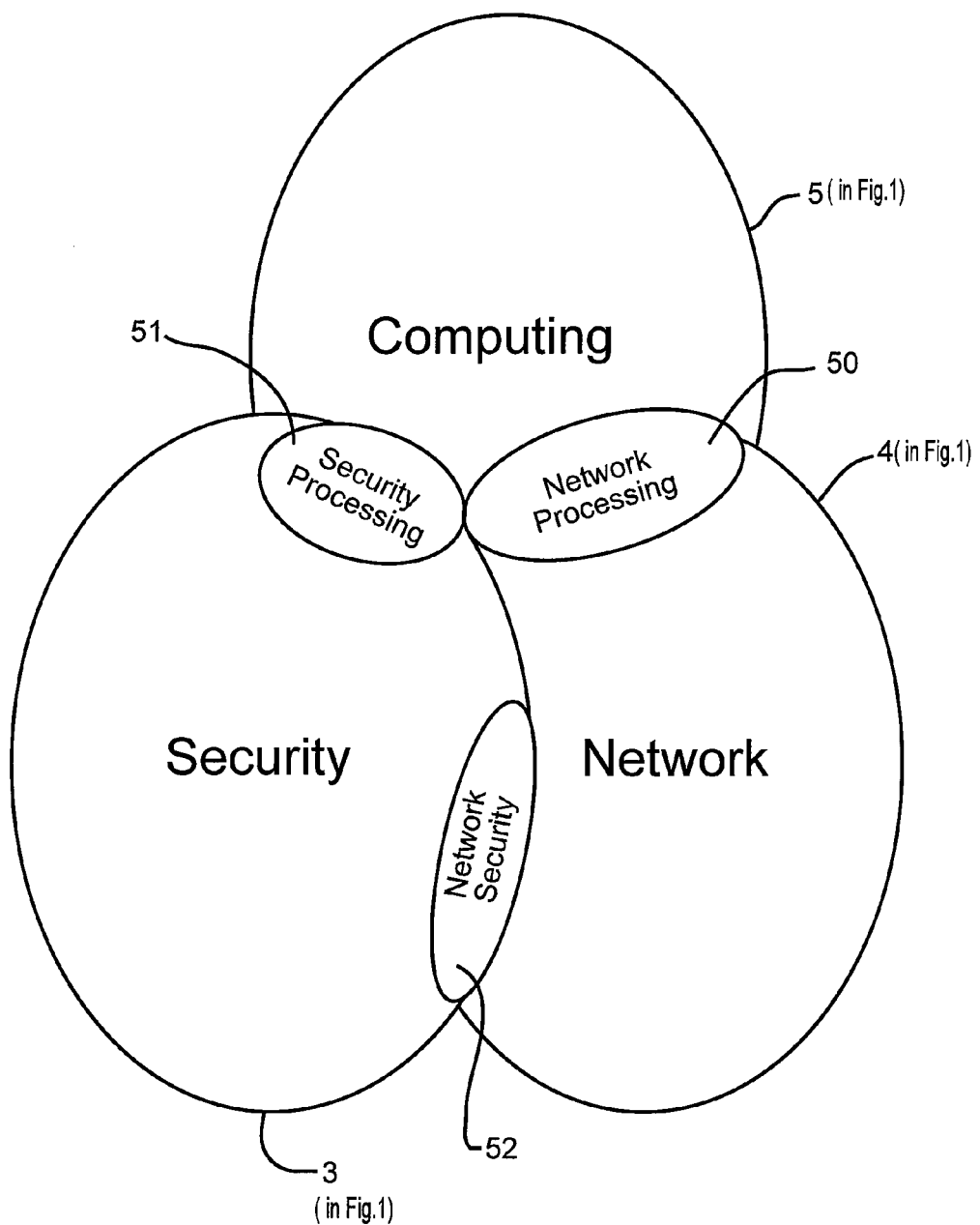
FIG. 10 shows a box diagram showing the fabric creation mechanism.

FIG. 10 shows a circle diagram showing how the security element 3, the computing element 5, and the network element 4 may interact. The computing element 5 may provide the processing required for general application, cognitive application, network and security processing. The cognitive element 2 of FIG. 1 may receive inputs to make the decision to set-up the required states for the computing element 5 to operate under. The overlapping of the computing element 5 and the security element 3 may identify security processing 51, the overlapping of the computing element 5 and the networking element 4 may identify network processing 50, and the overlapping of networking element 4 and the security element 3 may identify network security 52. All regions outside of these may provide other general functions of the elements.

FIG. 11 shows a box diagram showing an entire fabric domain and the elemental relationships. The capabilities elements 19 and 20 may be mapped to the following capability components: scale factor 54, morphing 55, self-learning 56, and caching 57. The scale factor 54 may comprise varying number of processing elements, multi-cores, etc. The morphing 55 may refer to the ability of the fabric to reconfigure and find residency in systems, modules, processors macro and micro architecture, etc. Self-learning 56 may comprise using a previous history of decisions and cognitive actions to learn to optimize future decisions and cognitive actions. Caching 57 may comprise the use of an edge cache at switch points in the virtual connectivity switch 7 to provide for network bandwidth traffic management and optimization. These caches may be integrated into distributed switch with virtual connection. This may in one way create a virtual cache for the entire fabric.

The capabilities element 19 and 20 may be linked to the configuration element 9. The configuration element 9 may be linked to reasoning 81 comprising the following reasoning components: trigger 58, modes 59, and states 60 and 61 within the cognitive element 2. The trigger 58 may identify a state of situation on self triggering, may attain a state change on triggering from another element, and/or may attain a state of situation on triggering from an external interface. The computing modes 59 may identify different functions that the fabric may be performing including fabric in processing data, fabric in network transactions, and fabric in secured transactions. The states 60 may identify what state a fabric is currently engaged in. For instance, the states 60 may determine that a fabric element has become an agent for execution by another fabric element, that the fabric is self-directing its computations, that the fabric is sharing code and/or data information, that the fabric is negotiating the request from another element, and/or that the fabric is inactive.

The reasoning components 58-61 within the cognitive element 2 may be linked via instructions 6 to the switch fabric virtual connectivity 7. The reasoning components 58-61 within the cognitive element 2 may also be linked to fabric computing actions 82 mapped to the 82 components 62, 63, 64, 65, 83, and 84 of computing element 5 providing computational processing and associated control. For example, box 62 may comprise stream processing, box 63 may comprise reconfigurable processing, box 64 may comprise soft processing, box 65 may comprise hybrid processing, box 83 may comprise the storing and retrieving of data from mass storage, and box 84 may comprise hardware and software element control configurations. The fabric computing action components 62, 63, 64, 65, 83, and 84 of computing element 5 may be linked to elements 36, 37, 38, and 39 of security element 3 and to elements 16, 17, and 18 of network element 4. Elements 36-39 of security element 3 may be linked to elements 16-18 of network element 4. Edge nodes may be optimized to meet functional and QoS requirements.

Figure 12:
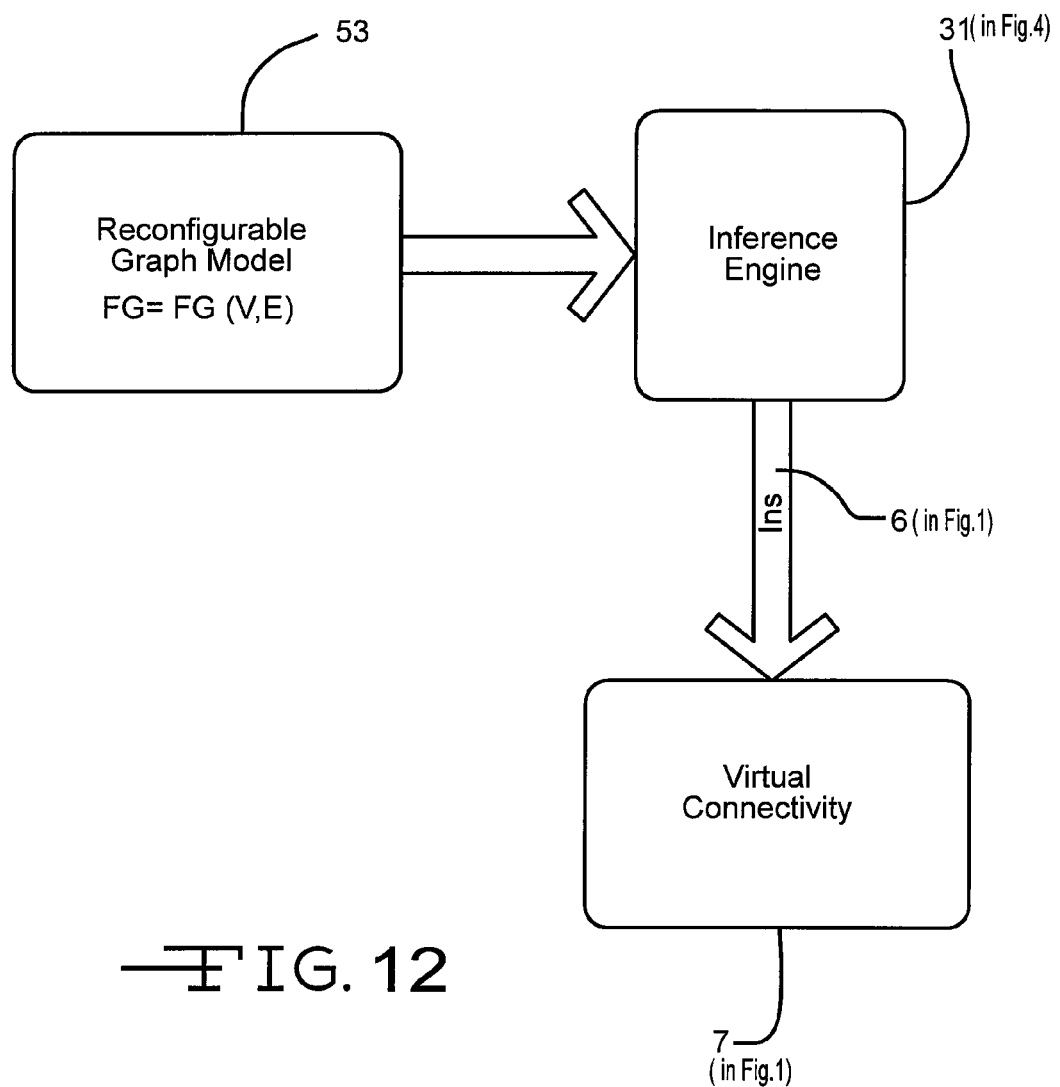
FIG. 12 shows a reconfigurable graph mechanism to create virtual connectivity.

FIG. 12 is a box diagram showing a reconfigurable graph for creation of virtual connectivity 7. The fabric creation mechanism may comprise a reconfigurable graph model 53, an inference engine and control 31, instructions 6, and virtual connectivity 7. Under the reconfigurable graph model 53 that can be processed, the connectivity algorithm may create the virtual intelligent fabric. Inputs to the connectivity algorithm may be provided.

In terms of the graph model, the fabric mapping process may be stated as follows: given an undirected graph G={V, E} with "n" edge nodes with fabric cell instances P (i) for i=1 to k such that the fabric element cells with an edge node may be mapped to FG (V, E) where FG (V, E) is a bidirectional graph with V vertices and E edges. The execution of this graph may extract the virtual connectivity 7 describing the fabric. The fabric cell element associations with edges may provide the cost implications for selecting and identifying resource availability and sharing based on constraints at each edge node. A super node may comprise a gateway for each fabric to cross its boundary to another with inherited permission. Without a super node, fabric movement to another fabric may be blocked unless permitted exclusively to meet the application functional and QoS requirements.

Figure 13A:
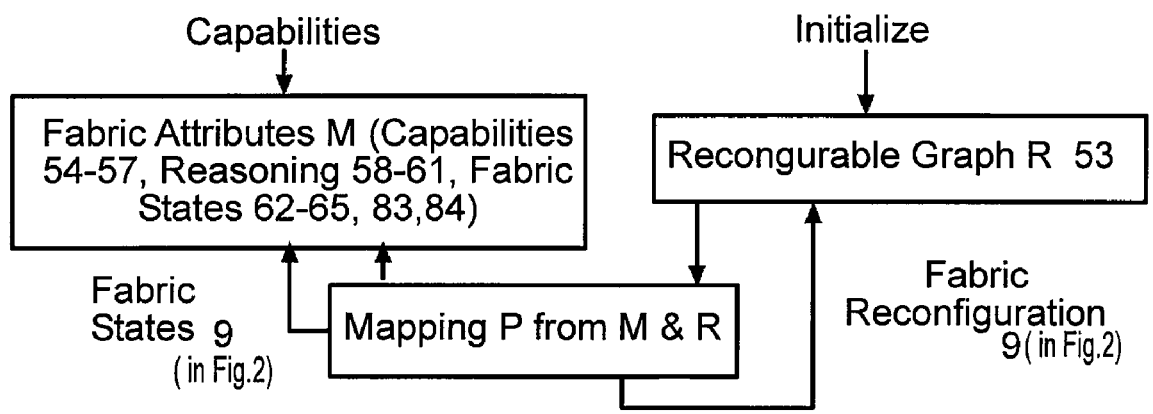
FIG. 13A shows fabric mapping.

FIG. 13 shows a box diagram showing one embodiment of a mapping of fabric. As shown P←{M, R} where P may comprise fabric created dynamically meeting functional and Quality of Service requirements. The parameter of Quality of Service requirements may include performance (sequential or parallel), data formats, synchronization (loosely or tightly coupled), cost (data rate, latency), and use (quality of image, audio, response time, etc). P may be optimized to cover as many edge nodes as possible. M may comprise the fabric attributes defined in terms of capabilities (C), fabric computing actions (A), reasoning (B), and R may comprise the reconfigurable connectivity for virtual fabric formation. As a result, P←{(A1,A2,A3,A4,A5,A6 . . . ), (B1,B2,B3, . . . ), (C1, C2, C3, C4, . . . ), FG ((E(1) . . . E(n)), (F(1), F(2), . . . F(k), . . . )}, where M is mapped to {54,55,56,57), (58,59,60), (62,63,64, 65,66,83,84)}, and R is mapped to graph {FG((E(1) . . . E(n)), (F(1), F(2), . . . F(k), . . . )}. FIG. 13A shows one embodiment of flow for fabric mapping with details of the elements of vertices and edges as described above.

Figure 14:
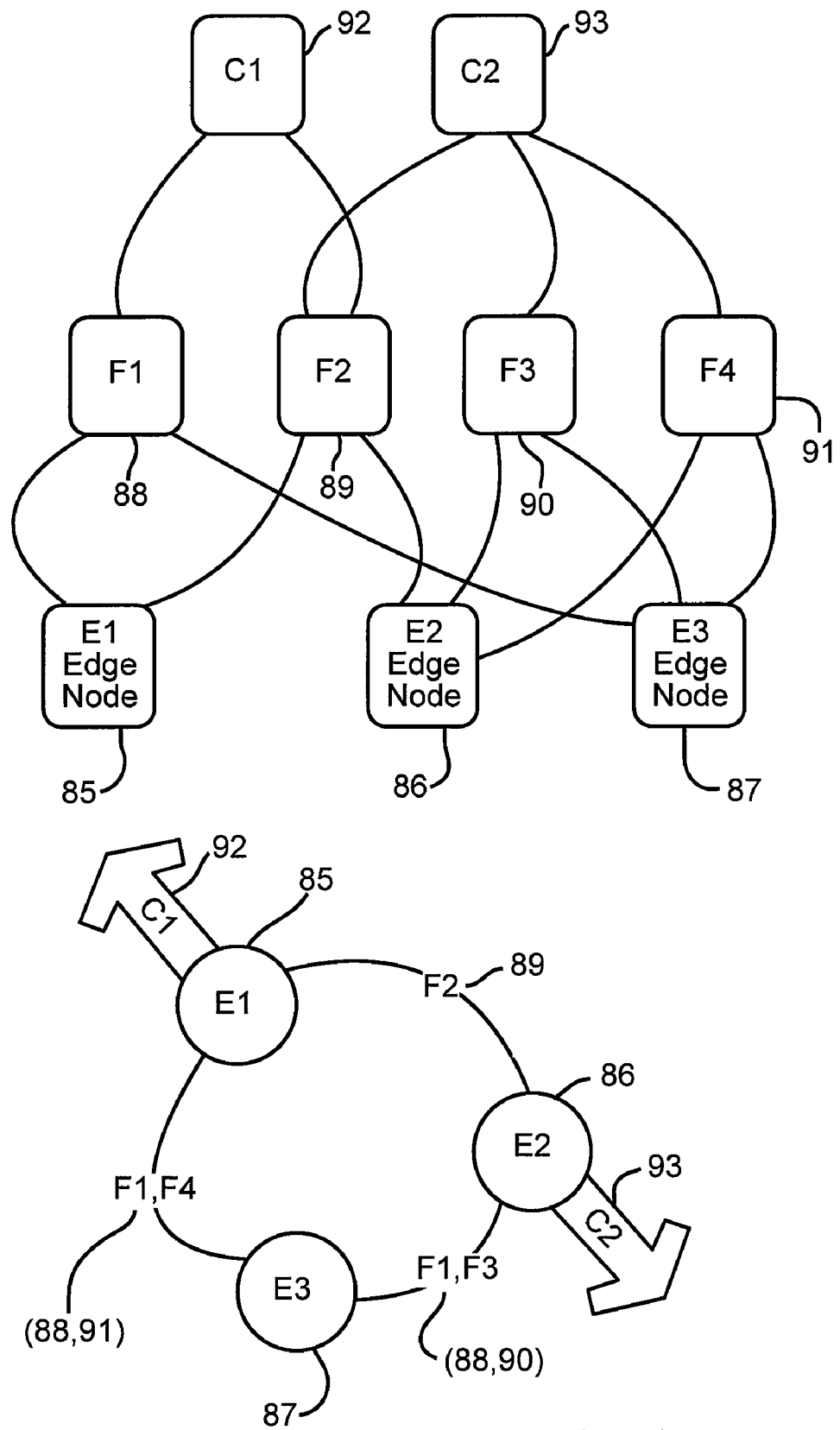
FIG. 14 shows an illustration of virtual association of fabric to edge nodes.

FIG. 14 shows an illustration of virtual association of fabric elements to edge nodes. Edge nodes 85, 86, and 87 may be provided. Fabric elements and sensors may be mapped within a physical independent aware computing fabric. Boxes 88, 89, 90, and 91 may comprise fabric elements that are formed by one or more of the edge nodes 85, 86, and 87. Each edge node may comprise a combination of sensors and processors which may be assigned to a situational awareness cognitive agent whose actions may be governed by certain rule sets. Fabric elements at the next level may form a group. For example, fabric elements 88 and 89 may form a fabric element cell 92 and fabric elements 90 and 91 may form a fabric element cell 93.

Figure 15:
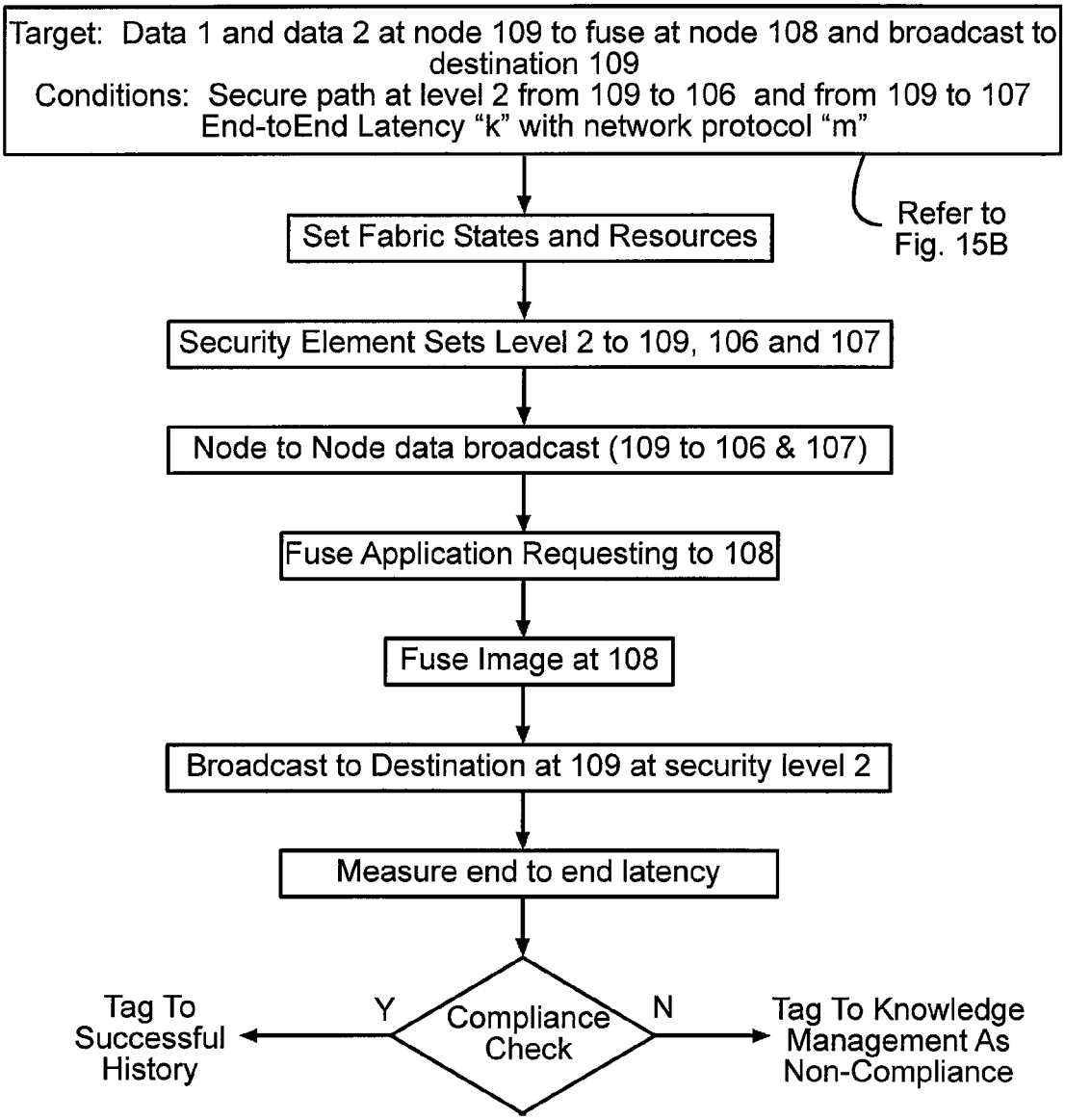
FIG. 15 shows an illustrative reasoning algorithm which may be applied to the data of FIG. 15B.
Figure 15B:
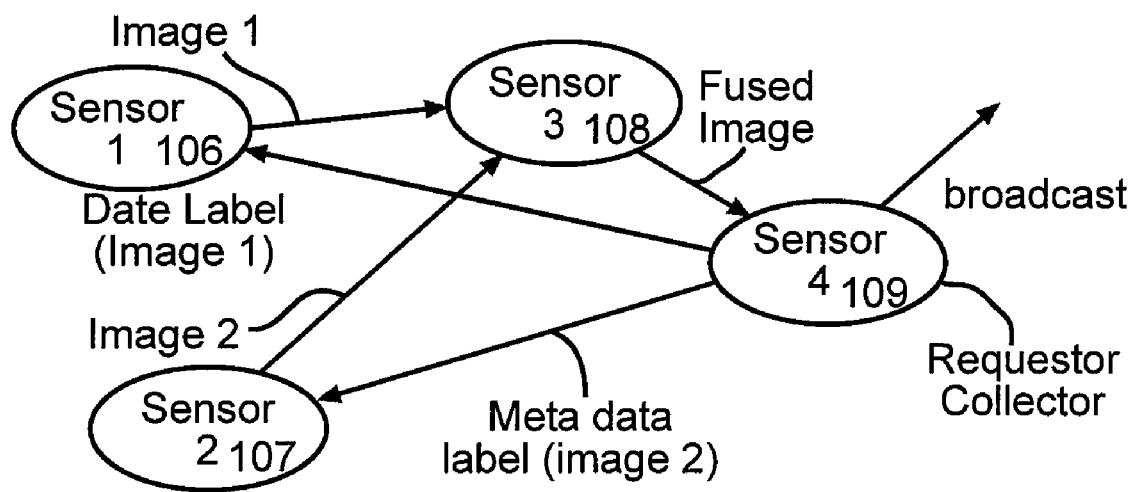
FIG. 15B shows an illustrative image fusion on edge fabric.

FIG. 15 shows an illustrative reasoning algorithm which may be applied to the data of FIG. 15B for a fensor fusion example. This example is further described in paragraph 60 below.

FIG. 15A is a table illustrating the fabric that may be created by collaboration of nodes 1, 2, and/or 3 for illustration shown in FIG. 14. The nodes and fabric element cells columns may indicate the neighborhoods of the nodes with the cells. The last row may indicate the next level virtual connectivity in which two elements may be given privileges as neighbors. However, the security policy may have further control of the direction of the information flow between them which in turn may be globally controlled by the cognitive element 2 of FIG. 1.

FIG. 15B shows an illustrative image fusion on edge fabric. Sensor 109 may comprise a source sensor of two images first broadcasted to 106 and 107 then fused by 108 and finally collected by 109. The node 109 in this scenario may also comprise a data label transmitter that has a specific request for fusion at 108. The security conditions may comprise a secure path at a level (such as level 2) for sensor 109 to 107, sensor 109 to 106, and sensor 108 to 109. In addition 106 and 107 may validate for a latency requirement such as "k" with a network protocol of "m". The parameters of validation results that include latency incurred may be received by the cognitive element to correct for routing to meet the latency. At each edge, the edge capacity, the edge load and the cost for the edge to move across the fabric may require evaluation. Cost may increase if there is more process overhead saturating the network, reducing the network capacity, and increasing network latency due to too many hops to reach the destination due to the higher network load.

Figure 16:
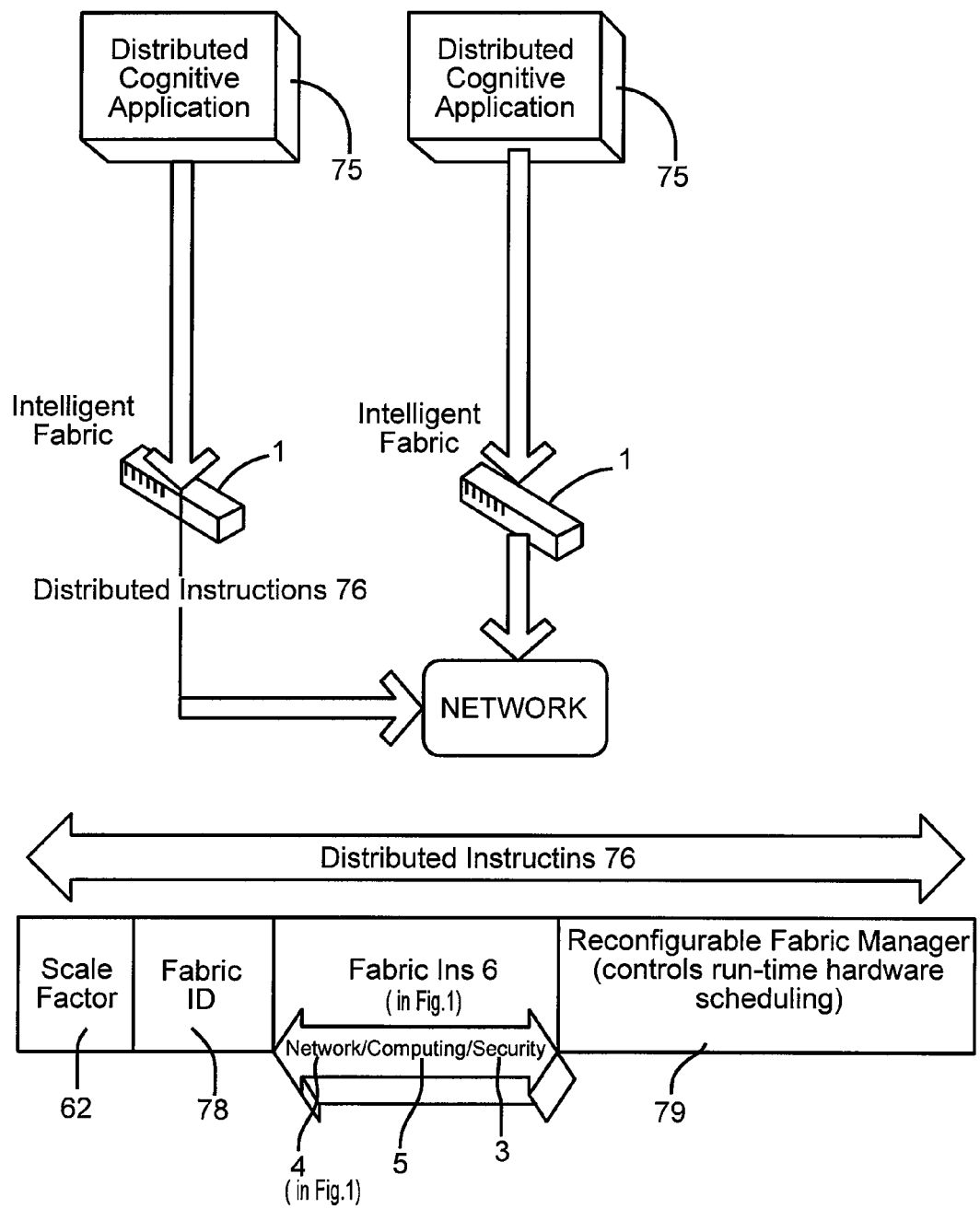
FIG. 16 shows a flowchart illustrating the delivery of a distributed cognitive application via a distributed instruction delivery.

FIG. 16 is a flowchart illustrating the delivery of a distributed cognitive application via a distributed instruction delivery. The distributed cognitive application 75 may be linked to the intelligent fabric 1 which may provide distributed instructions 76 (static compiling and run-time scheduling) to the network element 4. The distributed fabric instructions 76 may distribute the fabric consisting of a scale factor 62, a fabric ID 78, fabric instructions 6 between the networking, computing, and security elements 4, 5, and 3, and the reconfigurable fabric manager 79 (controlling run-time hardware scheduling at level 2).

The delivery of the instructions may be independent of any specific type of processor control architecture. The details of the instruction delivery and the control slots for each elemental functions involved may be implemented on a chip. A general method may be to distribute applications onto edge modules and connect them via an intelligent switch fabric. A distributed application control may be executed on an intelligent fabric with delivery of control instructions in a configurable hybrid two level mode. Scale factor 62 may specify the number of processing elements, the type of configuration for the processing elements, and the number of cores used in the soft processor. The fabric ID 78 may specify the current residency of the elements in levels from a global network to a processor microarchitecture.

For instance, fabric ID 78 may comprise a designation at a network (global) in which a single element address is given to a group of elements virtually connected. Fabric ID 78 may comprise a designation at an inter-module level (multiple chips) comprising a fabric group created among the elements in the silicon level but in different modules. Fabric ID 78 may comprise a designation at an intra-module level in which the elements are residing on the same chip. Fabric ID 78 may comprise a designation at a chip level in the same module where elements are mapped to different processing and storage elements.

Figure 17:
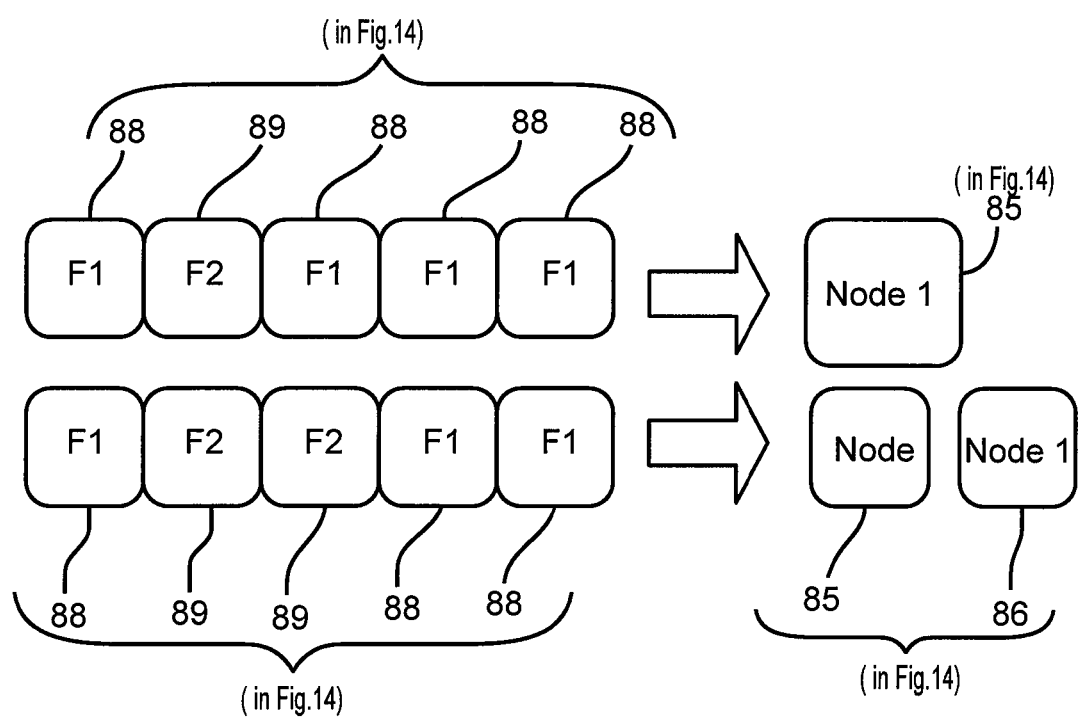
FIG. 17 shows a flowchart showing fabric morphing capability.

FIG. 17 illustrates a flowchart showing fabric morphing capability. F1 and F2 may comprise fabric element cells. As illustrated, four elements 88 of F1 and a single element 89 of F2 may be mapped to node 85 initially. If morphing control is given, a new configuration of three elements 88 of F1 and two elements 89 of F2 may be morphed into node 85 and node 86. This may leave one element to be moved and an additional element of F2 may be added into the nodes. The characteristic and image of the original formation may not be changed and may be mirrored in node 85 and node 86.

Figure 18:
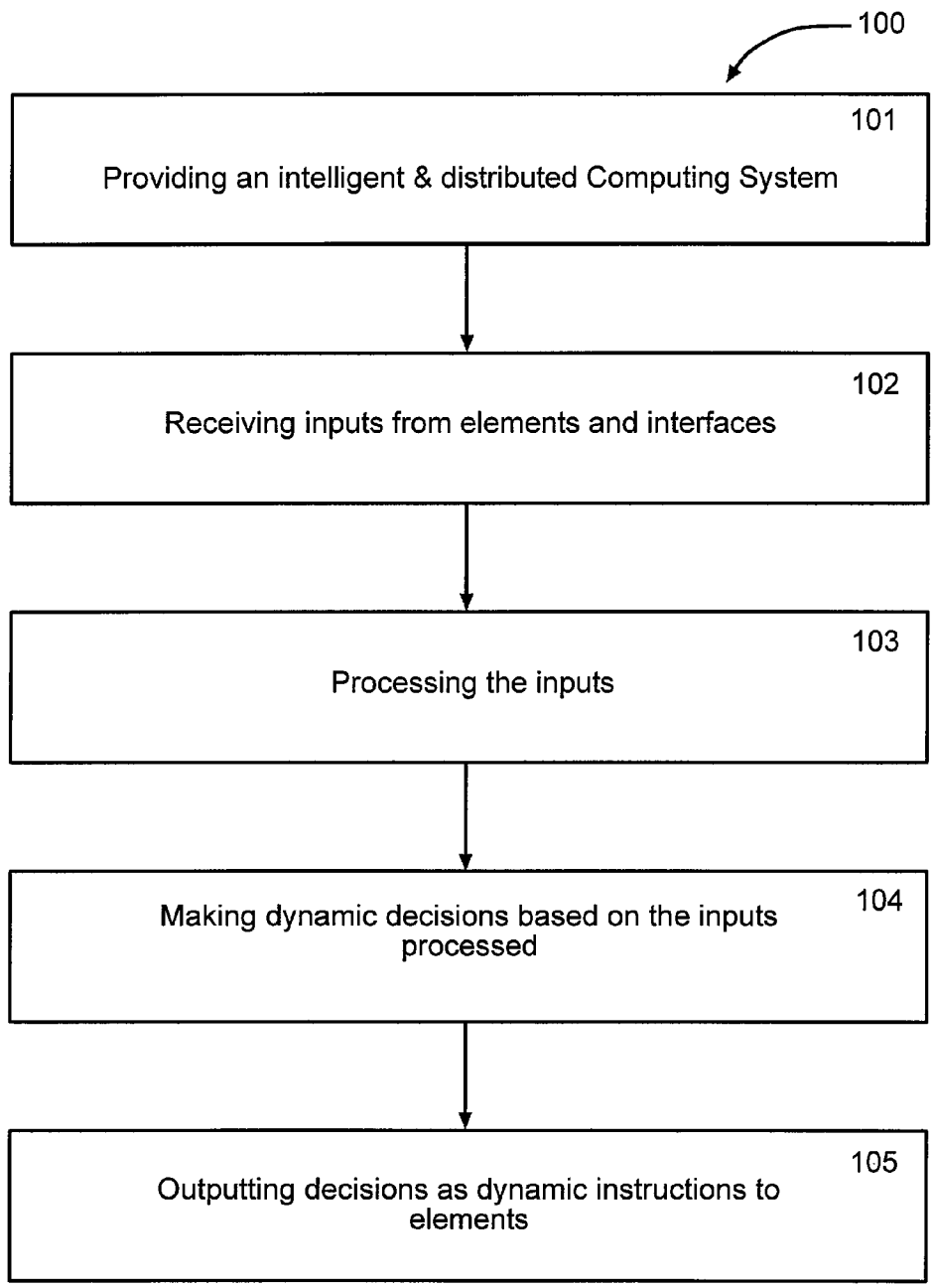
FIG. 18 is a flowchart of one embodiment of a method of making dynamic decisions in an intelligent distributed computing fabric system.

FIG. 18 is a flowchart of one embodiment of a method 100 of making dynamic decisions in an intelligent distributed computing fabric system. In one step 101, an intelligent distributed computing system is provided comprising: a cognitive element, a computing element, a security element, and a network element. In another step 102, the cognitive element receives inputs from the computing element, the security element, the network element, and from a sensor interface. In another step 103, the cognitive element processes the inputs from the computing element, the security element, the network element, and from the sensor interface. In still another step 104, the cognitive element makes dynamic decisions based on the inputs from the computing element, the security element, the network element, and from the sensor interface to adapt for varying dynamic situations. In yet another step 105, the cognitive element outputs dynamic instructions as commands, based on the dynamic decisions, to the computing element and the network element.

The method 100 may further comprise the steps of: the computing element transmitting inputs to the cognitive element and the security element; the computing element receiving dynamic output instructions as commands from the cognitive element; and the computing element following the dynamic output instructions from the cognitive element. The method 100 may additionally comprise the steps of: the security element receiving inputs from the computing element and the network element; and the security element transmitting security policy inputs to the cognitive element.

Other steps of the method 100 may include: the network element transmitting inputs to the security element and to the cognitive element; the network element receiving dynamic output instructions as commands from the cognitive element; and a reconfigurable interconnection virtually interconnecting the network element, the security element, and the computing element based on the dynamic output instructions from the cognitive element.

The method 100 may additionally include the steps of: the cognitive element managing requests from the computing element, the security element, and the network element; the cognitive element transmitting current fabric computing actions to the computing element; the cognitive element transmitting current fabric configurations to the network element; the cognitive element receiving current resource states and status from the computing element; and the cognitive element providing global control for dynamically adjusting security policy by the security element to accommodate for varying dynamic situations.

Additional steps of the method 100 may comprise: the computing element receiving and processing current fabric computing actions from the cognitive element; the computing element receiving requests from the cognitive element; the computing element processing requests received; the computing element receiving and following security instructions from the security element; and the computing element processing instructions and outputs to the network element.

Other steps of the method 100 may comprise: the security element receiving current fabric computing actions from the computing element; the security element receiving current network states from the network element; and the security element transmitting security policy to the cognitive element. Additional steps of the method 100 may comprise: the network element sending edge sensor information to the computing element, the security element, and the cognitive element; and the network element receiving current fabric configurations from the cognitive element.

Other aspects and features of the present disclosure may be obtained from a study of the drawings, the disclosure, and the appended claims. It should be understood, of course, that the foregoing relates to exemplary embodiments of the disclosure and that modifications may be made without departing from the spirit and scope of the disclosure as set forth in the following claims.

The invention claimed is:

1. An intelligent distributed computing fabric system comprising:
    a cognitive element, a computing element, a security element, and a network element;
    wherein the cognitive element is configured to receive inputs from the computing element, the security element, and the network element and to receive external information from a sensor interface; the cognitive element is configured to process the inputs from the computing element, the security element, and the network element, and to additionally process the external information from the sensor interface; the cognitive element is configured to make decisions based on the inputs from the computing element, the security element, and the network element, and based on the external information from the sensor interface, to adapt for dynamically varying situations in a fabric infrastructure; and the cognitive element is configured to output instructions for actions, based on the dynamic decisions, to the computing element, the security element, and the network element in order to virtually interconnect the computing element, the security element, and the network element;
    wherein the computing element is configured to transmit inputs to the cognitive element; the computing element is configured to receive the dynamic output instructions from the cognitive element; and the computing element is configured to follow the dynamic output instructions as commands from the cognitive element;
    wherein the security element is configured to receive inputs from the computing element and the network element; and the security element is configured to transmit current security policy inputs to the cognitive element; and
    wherein the network element is configured to transmits inputs to the security element and to the cognitive element.

2. The intelligent distributed computing fabric system of claim 1 wherein the cognitive element is configured to manage requests from the computing element, the security element, and the network element.

3. The intelligent distributed computing fabric system of claim 1 wherein the cognitive element is configured to transmit current fabric computing actions, and current configurations to the computing element.

4. The intelligent distributed computing fabric system of claim 1 wherein the cognitive element is configured to transmit current fabric computing actions, and current configurations to the network element.

5. The intelligent distributed computing fabric system of claim 1 wherein the cognitive element is configured to receive current resource states and status from the computing element.

6. The intelligent distributed computing fabric system of claim 1 wherein the cognitive element is configured to provide control for dynamic adjustment of the security policy by the security element to adapt for dynamic situations.

7. The intelligent distributed computing fabric system of claim 1 wherein the computing element is configured to receive current fabric computing actions from the cognitive element and the computing element is configured to process based on the current fabric computing actions.

8. The intelligent distributed computing fabric system of claim 1 wherein the computing element is configured to process application requests from the cognitive element.

9. The intelligent distributed computing fabric system of claim 1 wherein the computing element is configured to process data received from the cognitive element, the security element, and the network element.

10. The intelligent distributed computing fabric system of claim 1 wherein the computing element is configured to receive and follow inputs from the security element.

11. The intelligent distributed computing fabric system of claim 1 wherein the computing element is configured to process instructions and outputs to the network element.

12. The intelligent distributed computing fabric system of claim 1 wherein the security element is configured to receive current fabric computing actions from the cognitive element.

13. The intelligent distributed computing fabric system of claim 1 wherein the security element is configured to receive current network states from the network element.

14. The intelligent distributed computing fabric system of claim 1 wherein the security element is configured to transmit security policy to the cognitive element.

15. The intelligent distributed computing fabric system of claim 1 wherein the network element is configured to receive current fabric configurations from the cognitive element.

16. The intelligent distributed computing fabric system of claim 1 wherein the network element is configured to send edge network sensor information to the computing element, the security element, and the cognitive element.

17. An intelligent distributed computing fabric system comprising:
a cognitive element, a computing element, a security element, and a network element;
wherein the cognitive element is configured to receive inputs from the computing element, the security element, and the network element; the cognitive element is configured to process and manage requests from the computing element, the security element, and the network element; the cognitive element is configured to transmit current fabric computing actions and current configurations to the computing element; the cognitive element is configured to transmit the current fabric computing actions and the current configurations to the network element; the cognitive element is configured to receive current resource states and status from the computing element; the cognitive element is configured to control dynamic adjustment of security policy by the security element to adapt for varying dynamic situations; and the cognitive element is configured to output instructions for actions to the computing element, the security element, and the network element in order to virtually interconnect the computing element, the security element, and the network element;
wherein the computing element is configured to receive and process current fabric computing actions from the cognitive element; the computing element is configured to receive requests from the cognitive element; the computing element is configured to process requests received from the cognitive element; the computing element is configured to receive and follow security instructions from the security element; and the computing element is configured to process instructions and data and to output to the network element;
wherein the security element is configured to receive current fabric computing actions from the computing element; the security element is configured to receive current network states from the network element; and the security element is configured to transmit security policy updates to the cognitive element; and
wherein the network element is configured to receive current fabric configurations from the cognitive element.

18. A method of making dynamic decisions in an intelligent distributed computing fabric system comprising:
providing an intelligent distributed computing system comprising a cognitive element, a computing element, a security element, and a network element; and
the cognitive element receiving inputs from the computing element, the security element, the network element, and from a sensor interface;
the cognitive element processing the inputs from the computing element, the security element, the network element, and from the sensor interface;
the cognitive element making dynamic decisions based on the inputs from the computing element, the security element, the network element, and from the sensor interface to adapt for varying dynamic situations; and
the cognitive element outputting dynamic instructions as commands, based on the dynamic decisions, to the computing element and the network element.

19. The method of claim 18 further comprising the steps of the computing element transmitting inputs to the cognitive element and the security element; the computing element receiving dynamic output instructions as commands from the cognitive element; and the computing element following the dynamic output instructions from the cognitive element.

20. The method of claim 18 further comprising the steps of the security element receiving inputs from the computing element and the network element; and the security element transmitting security policy inputs to the cognitive element.

21. The method of claim 18 further comprising the steps of the network element transmitting inputs to the security element and to the cognitive element; the network element receiving dynamic output instructions as commands from the cognitive element; and a reconfigurable interconnection virtually interconnecting the network element, the security element, and the computing element based on the dynamic output instructions from the cognitive element.

22. The method of claim 18 further comprising the steps of the cognitive element managing requests from the computing element, the security element, and the network element; the cognitive element transmitting current fabric computing actions to the computing element; the cognitive element transmitting current fabric configurations to the network element; the cognitive element receiving current resource states and status from the computing element; and the cognitive element providing global control for dynamically adjusting security policy by the security element to accommodate for varying dynamic situations.

23. The method of claim 18 further comprising the steps of the computing element receiving and processing current fabric computing actions from the cognitive element; the computing element receiving requests from the cognitive element; the computing element processing requests received; the computing element receiving and following security instructions from the security element; and the computing element processing instructions and outputs to the network element.

24. The method of claim 18 further comprising the steps of the security element receiving current fabric computing actions from the computing element; the security element receiving current network states from the network element; and the security element transmitting security policy to the cognitive element.

25. The method of claim 18 further comprising the steps of the network element sending edge sensor information to the computing element, the security element, and the cognitive element; and the network element receiving current fabric configurations from the cognitive element.

* * * * *